E. JOHNSON

July 19, 1932. Re. 18,534

RESISTANCE ELIMINATOR FOR AIRCRAFT AND WATER CRAFT

Original Filed March 26, 1930 2 Sheets-Sheet 1

Inventor

EDWARD JOHNSON

By Clarence O'Brien

Attorney

E. JOHNSON

July 19, 1932. Re. 18,534

RESISTANCE ELIMINATOR FOR AIRCRAFT AND WATER CRAFT

Original Filed March 26, 1930 2 Sheets-Sheet 2

Inventor

EDWARD JOHNSON

By Clarence O'Brien

Attorney

Reissued July 19, 1932 Re. 18,534

UNITED STATES PATENT OFFICE

EDWARD JOHNSON, OF NEW ROCHELLE, NEW YORK

RESISTANCE ELIMINATOR FOR AIRCRAFT AND WATER CRAFT

Original No. 1,857,960, dated May 10, 1932, Serial No. 439,148, filed March 26, 1930. Application for reissue filed May 24, 1932. Serial No. 613,330.

This invention relates to improvements in resistance eliminators for air craft and water craft and has for its primary object, the provision of means for eliminating the parasitic resistance in air craft in flight and water craft in moving over or through a body of water.

Another object of the invention is to provide means for controlling or regulating the parasitic resistance on air craft when desired.

A further object is to provide a novel means whereby the lifting power of an air foil of an aeroplane can be increased without increasing the parasitic resistance and which also serves to stabilize air craft in flight, and water craft when moving in a forward direction over or through a body of water.

A still further object is to provide improved means whereby the speed of aircraft and water craft will be materially increased without increasing the horse power of the craft and which facilitates the easy maneuvering of air craft and water craft when in motion.

A still further object is to provide means whereby the bow or front of water craft or dirigibles will be prevented from swerving, thus maintaining the crafts on a given course.

The invention has for a still further object the provision of a construction which will accomplish the various aims set forth heretofore, and which may be inexpensively installed in air craft and water craft without necessitating any material alterations in the construction thereof, and which is positive and efficient in operation.

With these and other objects in view, the invention resides in the certain novel construction, combination and arrangement of parts, the essential features of which are hereinafter fully described, are particularly pointed out in the appended claims, and are illustrated in the accompanying drawings, in which:—

Figure 1:
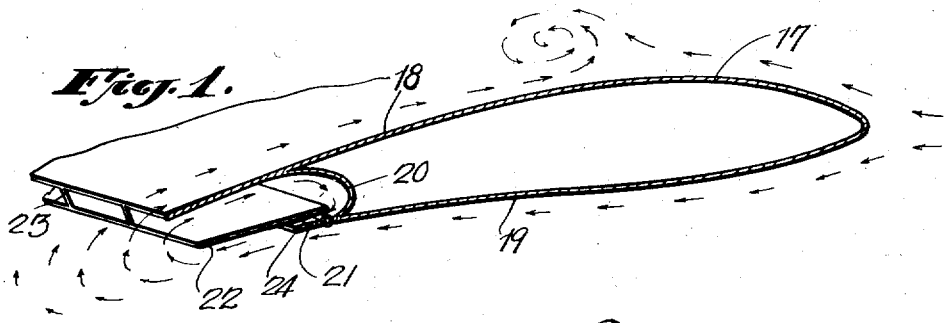
Figure 1 is a sectional perspective view of an aeroplane wing with my improvement embodied therein.

In the drawings, I have illustrated the principle of my invention as applied to the rear edge of an aeroplane wing 17, which wing embodies a top wall or air foil 18, and a spaced lower or under wall 19, the latter terminating short of the rear edge of the top wall and being connected thereto by a longitudinally disposed curved wall 20. Hinged to the lower wall 19, at the rear edge thereof is a resistance eliminator or flap valve 21. Supported in substantially parallel relation with respect to the rear end of the top wall 18 is a partition 22, which partition 22 is held in spaced relation to the top wall 18 by spaced transverse partitions 23 to divide the pocket into inner and outer communicating chambers. It will be appreciated that a vacuum will be created at the restricted passage 24 between the flapper 21 and the partition 22 causing the air stream to travel in the direction illustrated by the arrows, thus eliminating parasitic resistance on the top of the air foil or wall 18 at the rear thereof.

Figure 2:
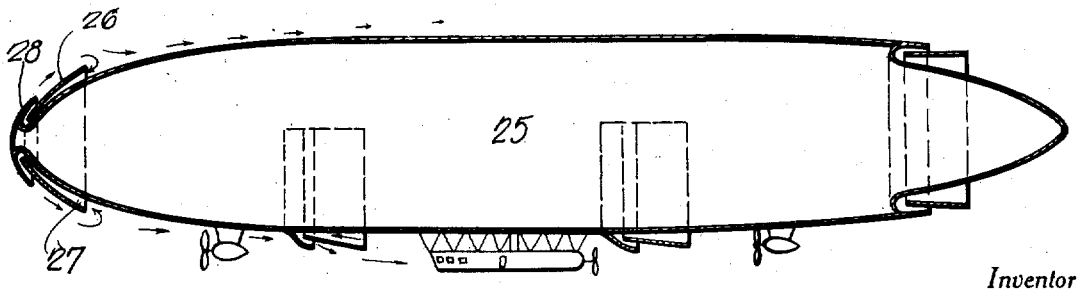
Figure 2 is a diagrammatic view illustrating the principle of my invention applied to a dirigible.

In Figure 2 I have illustrated the principle as applied to a dirigible, the envelope or bag of the dirigible being designated by the reference character 25. In this form the partition is designated by the numeral 26, and which is circular in form to encompass the nose end of the bag 25, and which is held spaced therefrom and substantially parallel to the walls of the nose by partitions 27. The tip of the nose overlaps the forward end of the partition 26 as at 28 to provide a restricted passage between the forward exterior portion of the partition and the inner walls of the nose portion 28. Although I have stated that the partition 26 is substantially parallel to the nose of the dirigible bag, the rear edge of the partition may be spaced at a slightly greater space than that between the front edge of the partiton and the nose 28. Although I have specifically described the application of the invention to the nose of the dirigible bag, the same principle may be embodied at the tail end of the bag and at intermediate portions, the partition passing around the intermediate portion of the bag only extending approximately half way thereround.

By embodying the same principle to the bags of dirigibles, it will be seen that the head resistance is materially reduced, which will facilitate easier maneuvering of the cumbersome craft and enable the same to be kept on a given course.

Figure 3:
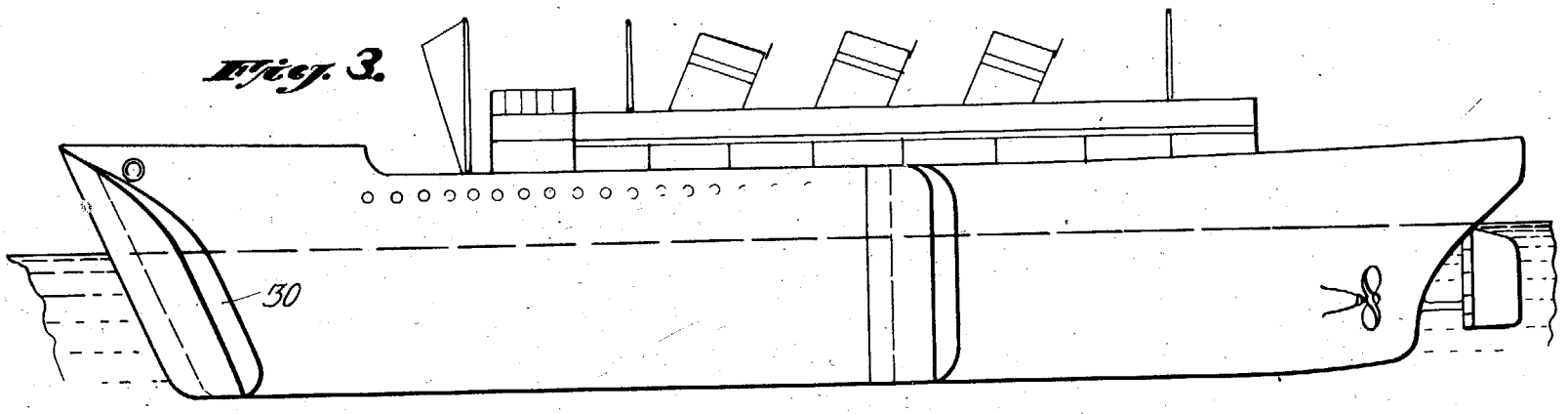
Figure 3 is a diagrammatic view in side elevation of the principle applied to a ship.
Figure 4:
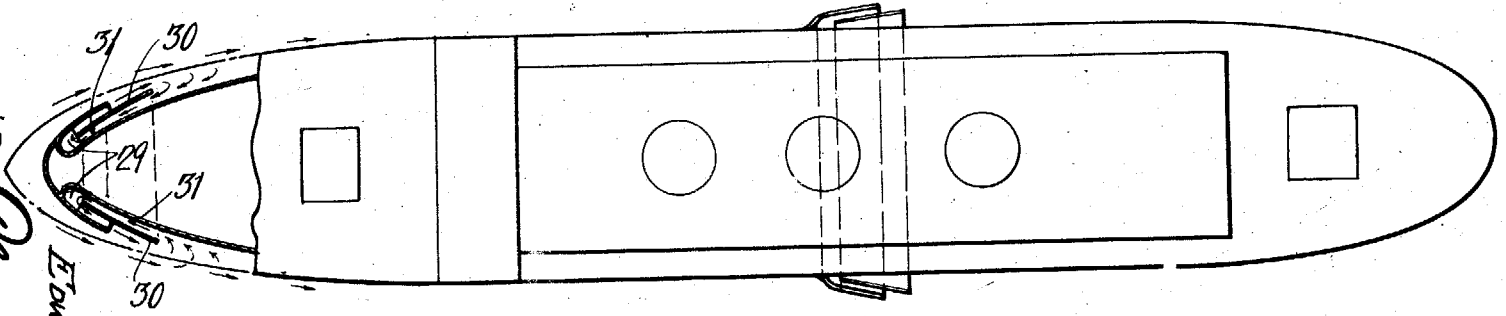
Figure 4 is a top plan view of the ship shown in Figure 3 with parts broken away.

In Figures 3 and 4, the principle is shown embodied in a ship or vessel in which the bow is provided on opposite sides with pockets 29 in which partitions or blades 30 extend, and which partitions are substantially parallel and in spaced relation to the sides of the hull of the vessel. The partitions or walls 30 are secured in shaped relation with respect to the walls of the pocket and the sides of the hull by partitions 31 and the said pockets are closed both at the top and bottom to enable the necessary vacuum to be set up in order to reduce the parasitic resistance of the vessel during its forward movement trough a body of water. Although I have described the principle as applied to the bow of a boat or vessel, the same may be equally applied to the vessel midships as illustrated.

In the use of my invention as shown in Figures 3 and 4, the pockets 29 are closed both at the top and bottom while the space between the sides of the hull and the partitions 30 are closed at the top and opened at the bottom. This tends to eliminate drag along the protruding keel and causes the reduction of resistance.

Figure 5:
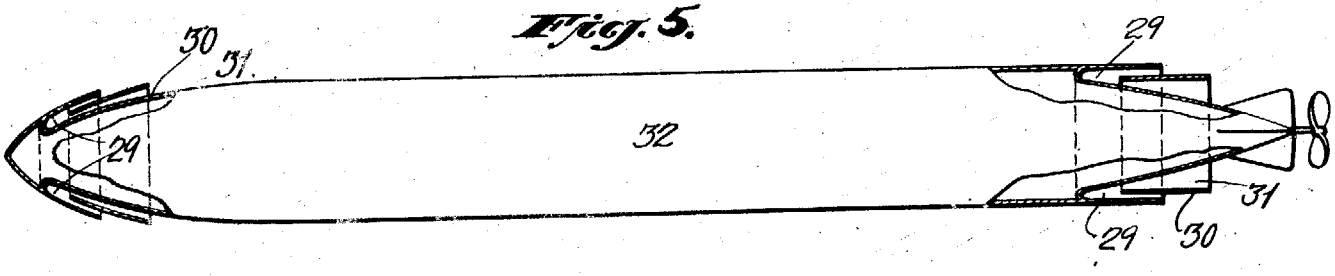
Figure 5 is a diagrammatic view illustrating the principle as applied to a marine torpedo.

In Figure 5 of the drawings, I have illustrated a marine torpedo 32 in which the invention is precisely the same as that shown in Figures 3 and 4, and like reference characters refer to like parts. The same principle may be embodied at the tail end of the torpedo as illustrated in Figure 5.

From the foregoing description it will be seen that by applying the principle to either an aeroplane wing, dirigible, steamship, or marine torpedo, the result is the same, namely the breaking down or reduction of the parasitic resistance, thus enabling these various crafts to travel at an increased speed without an increase of horse power, and will further prevent the nose of dirigibles, ships, and torpedoes, from swerving when in flight, and will materially increase the lifting power.

Although I have illustrated several uses to which my invention may be put, it will be understood that other types of air and water crafts may be equipped with this principle and that the parts and their arrangement may be modified if desired without in any way departing from the spirit of my invention, as I do not limit myself to the structural details herein shown and provided nor to anything less than the whole of the invention, limited only by the appended claims.

Having thus described the invention, what I claim as new and desire to secure by Letters Patent, is:—

1. In a propelled device, a body provided with two communicating passages, one passage opening forward of the other passage, said forwardly opening passage having a dimensional decrease to the atmosphere while said other passage has a dimentional increase to the atmosphere thereby causing a continuous circulation of air or water from the rear opening therethrough as and for the purpose specified.

2. In a propelled device, a body having a curvilineal passage of a dimensional increase to the atmosphere at one end and a dimensional decrease to the atmosphere at the other forward end thereby causing a continuous circulation of air or water therethrough from the rear opening for the purpose specified.

3. In a propelled device, a body having its surface so formed to provide a tapered passage having an inlet and outlet to the atmosphere, said outlet being forward of said inlet and having a dimensional decrease to the atmosphere, said inlet having a dimensional increase to the atmosphere thereby causing a continuous circulation of air or water therethrough from the rear thereof for the purpose specified.

4. A propelled device comprising a body having a pocket therein, opening to the atmosphere a partition member set in said pocket to form said pocket into a continuous passage having an inlet, and an outlet forward of said inlet, said inlet having a dimensional increase to the atmosphere, said outlet having a dimensional decrease to the atmosphere whereby a stream of air or water passing said outlet and a part of said stream of air or water entering said inlet causes a continuous circulation of air or water around said partition member for the purpose specified.

5. A propelled device comprising a body having a pocket opening to the atmosphere, a partition member set in said pocket to form said pocket into a compression chamber having an inlet of a dimensional increase to the atmosphere, an outlet to said chamber around the forward part of said member, said outlet having a dimensional decrease to the atmosphere whereby a stream of air or water passing the said outlet and a part of which enters the increased inlet opening to said compression chamber causing a continuous circulation of air or water around said partition member thereby maintaining a constant uniform compression of air or water within said compression chamber as and for the purpose specified.

6. A propelled device comprising a body the outer surface of which is so formed to provide a pocket which opens to the atmosphere, a partition member set in said pocket and spaced from the walls thereof for dividing said pocket into inner and outer communicating chambers, both of said chambers opening to the atmosphere, said inner chamber having a dimensional increase to the atmosphere said outer chamber having a dimensional decrease to the atmosphere and opening in an outwardly and rearwardly direction whereby a stream of air or water passing the restricted opening to the atmosphere to said outer chamber will, owing to the greater leverage at that point create a greater outward suction within said outer chamber than that within the inner chamber and will continuously draw out from said communicating inner chamber any partial vacuum drag therein and owing to a part of said stream of air or water having its path abruptly widened at the larger opening.

7. A propelled device comprising a body having a pocket opening to the atmosphere, a partition member set in said pocket for dividing the pocket into inner and outer communicating chambers, both of said chambers opening to the atmosphere, said inner chamber having a dimensional increase to the atmosphere and said outer chamber having a tapered release vent to the atmosphere, whereby the atmosphere pressure of air or water within said inner chamber being greater than the pressure of air or water within said outer chamber is partially released through said communicating outer chamber and taper release vent thereof to the atmosphere, thereby causing a continuous circulation of air or water around said partition member as and for the purpose specified.

8. A propelled device comprising a body having a pocket opening to the atmosphere, a partition member set in said pocket for dividing said pocket into inner and outer communicating chambers both of said chambers opening to the atmosphere, said inner chamber having a dimensional increase to the atmosphere while said outer chamber has a dimensional increase to the atmosphere, said pocket and partition member being so formed and arranged at the communicating passage of said chambers whereby the pressure and also the circulation of air or water can be governed as desired within said chambers in the direction as and for the purpose specified.

9. A propelled device comprising a body having a pocket therein opening to the atmosphere, a partition member set in said pocket for dividing the pocket into inner and outer communicating chambers, both said chambers opening to the atmosphere, said inner chamber having a dimensional decrease inwardly from the atmosphere and being less than the outer chamber dimension adjacent the communicating passage of said chambers, said outer chamber having a dimensional decrease to the atmosphere whereby the pressure and circulation of air or water within the inner chamber is partially restrained from entering said outer chamber, the air or water being drawn from said outer chamber by the passing stream of air or water.

10. A propelled device including a body having a pocket therein opening to the atmosphere, a partition member set in said pocket for dividing the pocket into inner and outer communicating chambers, both said chambers opening to the atmosphere said inner chamber having a dimensional decrease inwardly from the atmosphere and being larger than the outer chamber dimension adjacent the communicating passage of said chambers, said outer chamber having a dimensional decrease to the atmosphere whereby the pressure of air or water within both of said chambers is increased and causes a circulation of air or water around said partition member as and for the purpose specified.

11. A propelled device including a body having a pocket therein opening to the atmosphere, a partition member set in said pocket for dividing the pocket into inner and outer communicating chambers, both of said chambers opening to the atmosphere, said inner chamber being larger and having a dimensional increase and also increased area opening to the atmosphere, said outer chamber being smaller and having a dimensional decrease to the atmosphere forward of said area opening whereby atmospheric pressure of air or water within said area opening enters said inner chamber and a part of which is released or is drawn through said outer chamber to the atmosphere by the passing stream of air or water as and for the purpose specified.

In testimony whereof I affix my signature.

EDWARD JOHNSON.